(12) United States Patent
Marcus

(10) Patent No.: US 8,185,443 B2
(45) Date of Patent: May 22, 2012

(54) METHOD AND APPARATUS FOR AUTHORIZING A PAYMENT VIA A REMOTE DEVICE

(75) Inventor: David A. Marcus, Menlo Park, CA (US)

(73) Assignee: eBay, Inc., San Jose, CA (US)

( * ) Notice: Subject to any disclaimer, the term of this patent is extended or adjusted under 35 U.S.C. 154(b) by 261 days.

(21) Appl. No.: 12/607,056

(22) Filed: Oct. 27, 2009

(65) Prior Publication Data

US 2010/0106620 A1    Apr. 29, 2010

Related U.S. Application Data

(60) Provisional application No. 61/108,730, filed on Oct. 27, 2008.

(51) Int. Cl.
*G06Q 30/00*    (2012.01)

(52) U.S. Cl. .................. 705/26.1; 705/14.1; 705/14.23; 705/26.61; 705/39; 705/44

(58) Field of Classification Search ........ 705/26.1–27.2, 705/39, 44, 14.1, 14.23
See application file for complete search history.

(56) References Cited

U.S. PATENT DOCUMENTS

| | | | |
|---|---|---|---|
| 7,093,281 B2 | 8/2006 | Bhatnager et al. | |
| 7,155,416 B2 | 12/2006 | Shatford | |
| 7,177,837 B2 | 2/2007 | Pegaz-Paquet et al. | |
| 2002/0165820 A1 | 11/2002 | Anvekar et al. | |
| 2003/0191711 A1* | 10/2003 | Jamison et al. | 705/40 |
| 2004/0044739 A1 | 3/2004 | Ziegler | |
| 2006/0076400 A1 | 4/2006 | Fletcher | |
| 2006/0253389 A1 | 11/2006 | Hagale et al. | |
| 2006/0269057 A1* | 11/2006 | Short et al. | 380/228 |
| 2007/0094150 A1 | 4/2007 | Yuen et al. | |
| 2007/0143231 A1 | 6/2007 | Pegaz-Paquet et al. | |
| 2007/0175978 A1 | 8/2007 | Stambaugh | |
| 2007/0199985 A9 | 8/2007 | Truitt et al. | |
| 2007/0203836 A1 | 8/2007 | Dodin | |
| 2007/0203850 A1 | 8/2007 | Singh et al. | |
| 2007/0220565 A1* | 9/2007 | Angel et al. | 725/87 |
| 2008/0103984 A1* | 5/2008 | Choe et al. | 705/76 |
| 2008/0109352 A1 | 5/2008 | Csoka | |
| 2008/0172306 A1 | 7/2008 | Schorr et al. | |
| 2009/0119184 A1* | 5/2009 | Mages et al. | 705/26 |
| 2009/0138366 A1* | 5/2009 | Bemmel et al. | 705/17 |

OTHER PUBLICATIONS

First Data unveils Web product Anonymous. Fund Action. New York: Sep. 15, 1997. vol. 8, Iss. 36; p. 12, 1 pgs.*

* cited by examiner

*Primary Examiner* — Will Allen
(74) *Attorney, Agent, or Firm* — Haynes and Boone, LLP

(57) ABSTRACT

A method of and system for authorizing a transaction remotely is disclosed. A customer uses a computer to browse for a product displayed on the internet. The customer may enter a unique number into the computer. The unique number is authorized and an authorization code is sent to the customer's communication device. The customer enters the authorization code into the computer to complete the transaction.

19 Claims, 3 Drawing Sheets

US 8,185,443 B2

METHOD AND APPARATUS FOR AUTHORIZING A PAYMENT VIA A REMOTE DEVICE

CROSS-REFERENCE TO RELATED APPLICATIONS

This application claims priority to and the benefit of U.S. Provisional Patent Application No. 61/108,730, filed Oct. 27, 2008, the disclosure of which is now incorporated herein by reference.

FIELD OF THE INVENTION

The present invention relates generally to remote communications, and more specifically to remote electronic authorization of payment for a product.

BACKGROUND OF THE INVENTION

It is known to receive content over a remote or mobile device. For example, a user may receive news stories on a cell phone, personal data assistant (PDA), or computer. So, too, a good or service or other product may be offered for sale by a vendor to a customer through an electronic catalog such as for example over the Internet. The customer may use mobile cellular telephone to browse the Internet for the desired product and receive premium rate mobile terminating text messages detailing pricing information of the product. Payment information, payment authorization and confirmation data are transmitted between the customer's mobile cellular telephone and the vendor server. One example of such a system is described in U.S. patent application Ser. No. 11/824,607, filed Jun. 29, 2007, and published on Jan. 1, 2009, as US 2009/0006217, the disclosure of which is now incorporated herein by reference. Payment may be charged to the customer's telephone account or to a credit card or debit account in the event the telephone subscriber line cannot be validated as disclosed in U.S. Pat. No. 7,080,049, dated Jul. 18, 2006, and U.S. Pat. No. 7,527,194, dated May 5, 2009, the disclosures of each of which are now incorporated herein by reference. What is needed is a method and system that is more secure while reducing transaction fees and settlement times.

SUMMARY OF THE INVENTION

The present invention may comprise one or more of the following features and combinations thereof.

A method of authorizing a transaction comprising the steps of: accessing a transaction site, entering a personal identification number into a request authorization field associated with the transaction site, transmitting an authorization code, and entering the authorization code into an authorization field associated with the transaction site.

The method may further comprise the step of selecting a transaction. Such a transaction may comprise purchasing an item or gaining access to a restricted site.

The method may further comprise the step of authorizing a user associated with the personal identification number to complete the selected transaction. For example a background check and/or a credit check may be conducted on the user associated with the personal identification number entered into the request authorization field.

The method may further comprise the step of charging the user for completing the transaction.

The method may further comprise the step of providing a notice of transaction completion.

Illustratively, at least one of the steps may be accomplished on a remote device. So, too, each of the steps may be accomplished on a remote device. Such a remote device may chosen from the list consisting of a mobile phone, a computer, and a personal data assistant. The same or a different remote device may be used for one or more of the steps.

The personal identification number may comprise the user's mobile telephone number.

The authorization code may comprise a PIN code.

Any or all of the steps may be performed in a secure environment. For example and without limitation, the transmission of the personal identification number, the transmission of the authorization code, the transmission of payment information and the like may all be encrypted.

A user may be offered an incentive to provide information to "link" to one or more payment accounts other than their phone carrier. For example and without limitation a credit card account, a bank account, a PayPal account, a brokerage account, a virtual reality account, or other financial services account. This incentive illustratively may be offered after completing an SMS carrier-based transaction. In the example of a PayPal account, the user would require the user to enter their PayPal username and password into a PayPal-hosted web page and agree to a billing agreement, which effectively gives the processing server the right to bill that user's PayPal account at will without the user's ongoing permission.

Incentives, for example and without limitation incentive points, may be awarded to the user to incentivize linking to payment accounts other than their phone carrier accounts. For example and without limitation incentive points may be awarded when a user makes a purchase, when a user links to an account other than their phone carrier account, or when a user refers a new user who completes a transaction. These incentive points illustratively may be used to purchase a product.

A method of authorizing a transaction comprises the steps of: displaying to a customer on a computer a product offered for sale on a product server, the computer and the server each being in communication with an internet; choosing for purchase via the computer the product at a selected price; sending the computer a request authorization field inviting the customer to enter an identification number uniquely associated with the customer; entering the unique identification number into the request authorization field; verifying the identification number; transmitting an authorization code to a communication device associated with the customer via the unique identification number; entering the authorization code into an authorization field displayed on the computer; verifying the authorization code; and charging the price to an account associated with the customer.

A computer program product including a medium readable by a processor, the medium carrying instructions which, when executed by the processor, cause the processor to carry out the invention.

Also disclosed is a transaction authorization system comprising means for carrying out the invention.

These and other objects of the present invention will become more apparent from the following description of the illustrative embodiment.

DESCRIPTION OF THE ILLUSTRATIVE EMBODIMENTS

Figure 1:
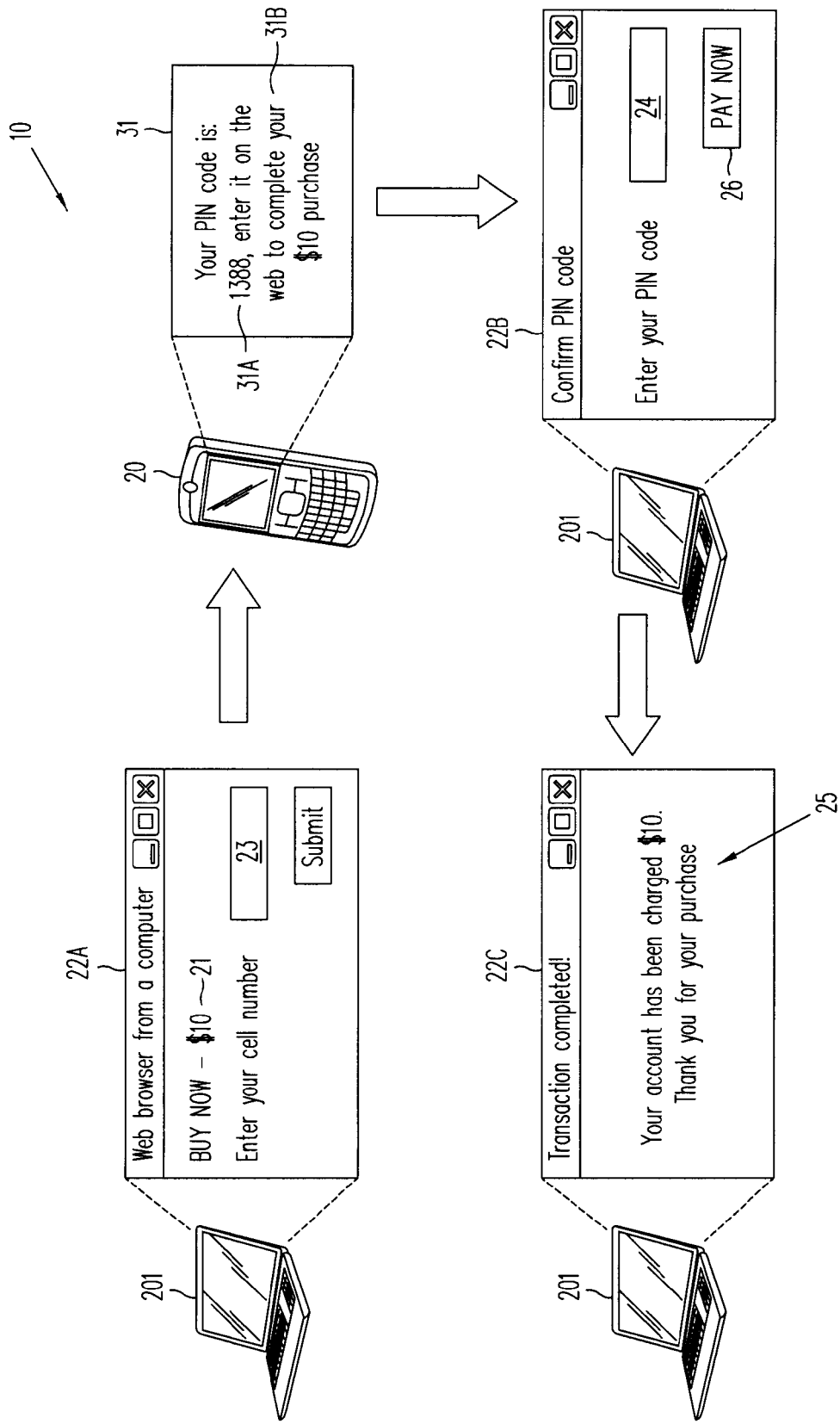
FIG. 1 depicts an illustrative method for authorizing a transaction over an internet.
Figure 2:
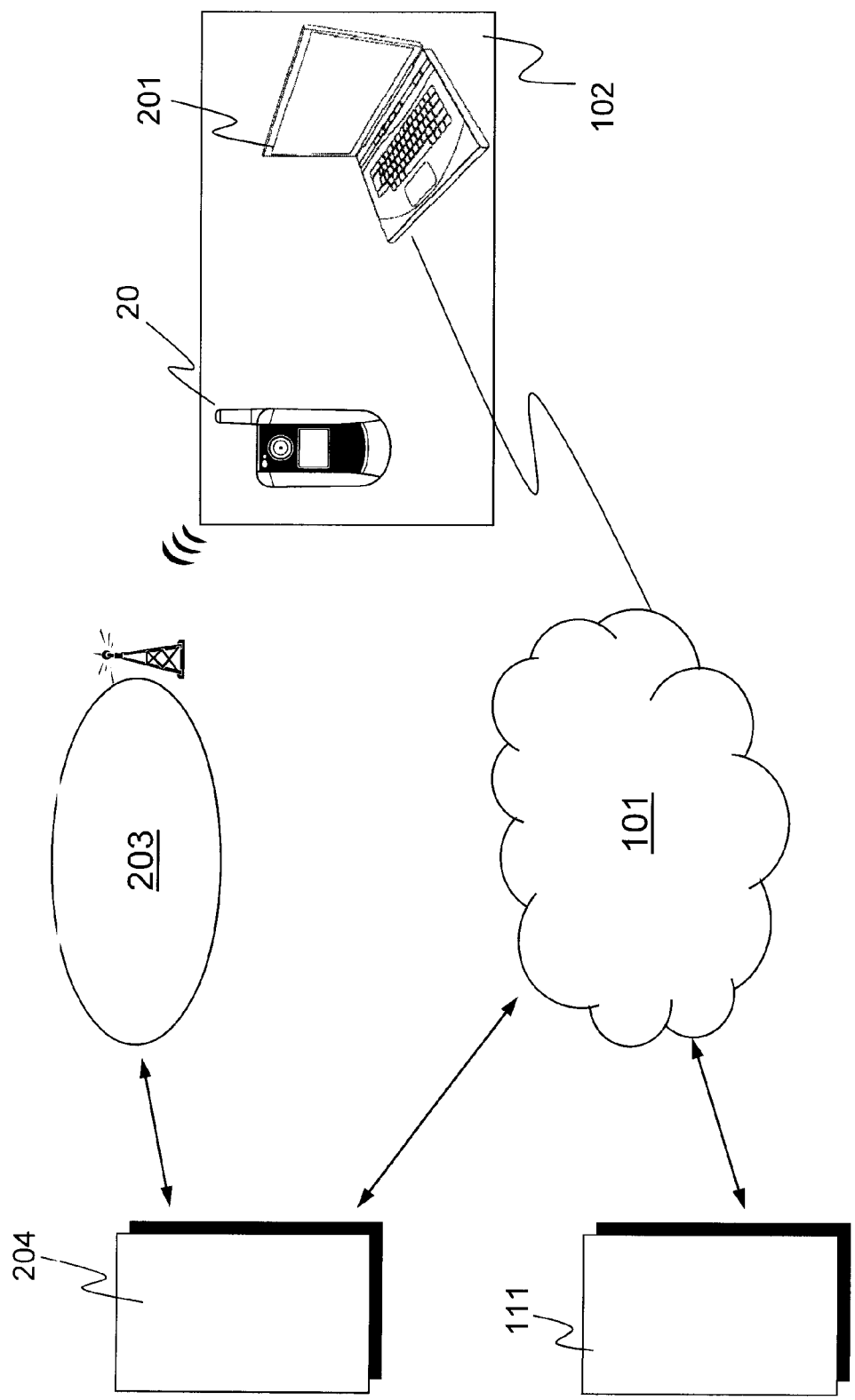
FIG. 2 depicts an illustrative system for authorizing a transaction.

For the purposes of promoting an understanding of the principles of the invention, reference will now be made to a number of illustrative embodiments illustrated in the drawings and specific language will be used to describe the same.

Referring to the Figures, an illustrative method 10 of authorizing a transaction via a remote device 201, 20 is depicted. Illustratively, a user or customer may use a remote device, such as for example a computer 201, to locate a transaction, for example the viewing and purchasing of a product (for example a good or a service) for sale, on a site on the Internet 101. It will be appreciated that other remote devices, such as for example a communication device such as for example a cellular phone 20, a smart phone, or a personal digital assistant (PDA) or the like may also be used. The transaction site may be hosted on a machine in communication with the Internet. For example one or more computers or servers 111, which may be seller, product, transaction or vendor server(s), may be in communication with the Internet 101 and may display one or more products for sale at one or more respective price points or prices 21 to a customer(s) 102 also in communication with the Internet via a web browser on a computer such as for example browsing computer 201. One or more additional computers or servers 204, which illustratively may be authorizing or processing server(s), may also be in communication with the Internet. The processing server illustratively may be in communications with one or more telephone networks 203, which in turn are in communication with one or more communication devices 20, such as for example cellular phone 20. It will be understood that the product servers and the processing serves may be one in the same. It will further be appreciated that a mobile communication device 20 may have both mobile telephone capabilities with connection or communication with mobile telephone network(s) 203 and computing capabilities with connection or communication with the Internet 101. The communication device 20 could comprise a smart phone of a PDA.

A customer may choose a product displayed on the product server 111 for purchase at a certain or selected price 21. The customer illustratively will be prompted or invited to enter an identification number uniquely associated with the customer. For example, an invite payment window 22A may open and direct the user to enter their cellular phone number or other authorization code into a request authorization field 23. As known to those skilled in the art, cell numbers may be associated with a user. For example, a subscriber identity module (SIM) card is a smart card that may contain user account information. Plugging a SIM card into a mobile phone, such as for example a global system for mobile (GSM) communications phone programs that phone for use and stores thereon the mobile station or mobile subscriber integrated services digital network (MSIDN) or telephone number. GSM also provides for short messaging service (SMS), which provides text messages to be sent to/from a GSM phone. Illustratively, that mobile phone number or MSIDN, or other authorization code, may be associated with the user's personally identifiable information, for example their credit and financial data, which illustratively may be accessed to see if the person has the requisite wherewithal to enter into the transaction. In the case of the exemplary purchase, for example, it may be determined whether the person has sufficient credit, sufficient payment history, sufficient incentive points, or sufficient real or virtual funds or other relevant criteria to purchase the product at the selected price point 21. Of course, determining the credit-worthiness or ability to pay of the user is not required. In any event, the customer may type their phone number or other identification number onto this site in the request authorization field 23 to initiate the exemplary machine-hosted transaction, such as for example a purchase of a product, at a certain price point 21. If it is determined, for example by the processing server 204, that the user or customer is authorized to make the purchase at the price 21, then an authorization code, for example a PIN code 31A, will be sent to the user's communication device, for example cellular phone 30, or other mobile or remote device, through for example text messaging (for example and without limitation, short message service or silent messaging service each commonly known as "SMS") 31. The system may provide instructions 31B along with the PIN code 31A. For example, the text message may tell the user to enter the PIN code 31A on the web to complete the purchase. Illustratively, the user can type the PIN code 31A into an authorization field 24 on a confirmation page 22B on the customer's computer 201 in order to proceed with the transaction. For example, after typing in the PIN code 31A, the user illustratively may click on the "Pay Now" button 26 or other equivalent execution button or link displayed on computer 201. The system 10, for example the processing server 201, illustratively may then charge the user. Such charges may be based on the user's preferences, which for example may be stored in the user's profile, or which could be selected by the user at the time of the transaction. Such preferences illustratively could include for example and without limitation charging or billing the user: through the user's carrier on their cellular phone bill; through one or more of their credit card accounts (if the user associated their phone number with their credit card number(s)); through the user's financial institution, such as for example a bank checking account (if the user associated their phone number with their checking account) or other bank account, or credit union account, or securities broker or dealer account, or insurance account, or an e-commerce money transfer account, such as for example and without limitation a PayPal account, and the like. Illustratively, the system may provide a notice of completion 25 of the transaction for example by presenting another text window 22C on the computer 201. It will be appreciated that each of the steps may be accomplished on a single remote device. For example, a user could access a web site on their PDA or phone 20 remote device. So, too, a computer 201, could be used for all steps, as in the case where the user has an internet phone account, such as a Skype phone. The user could enter their personal identification number, for example the phone number of the PDA/smart phone 20 or Skype phone, or other remote device into the site's request authorization field 23, and the authorization code 31A could be sent to that same, or a different, remote device 20. The user could then enter the authorization code 31A into the authorization field on the previously accessed site on that same remote device 20 in order to complete the transaction. It will further be understood that the method is applicable to other than purchases. For example, and without limitation, the method could be used to request, authorize and grant access to restricted sites, physical locations and the like. For example, the authorization code sought could be an access code to disable a building alarm, or to gain access to a proprietary web site.

A user may be offered an incentive to provide information to "link" to one or more payment accounts other than their phone carrier. For example and without limitation a credit card account, a bank account, a PayPal account, a brokerage account, a virtual reality account, or other financial services account. This incentive illustratively may be offered after completing an SMS carrier-based transaction. In the example of a PayPal account, the user would require the user to enter their PayPal username and password into a PayPal-hosted web page and agree to a billing agreement, which effectively gives the processing server 204 the right to bill that user's PayPal account or other selected account at will without the user's ongoing permission. Incentives, for example and without limitation incentive points, may be awarded to the user to incentivize linking to payment accounts other than their phone carrier accounts. For example and without limitation incentive points may be awarded when a user makes a purchase, when a user links to an account other than their phone carrier account, or when a user refers a new user who completes a transaction. These incentive points illustratively may be used to purchase a product. Incentives could also take the form of virtual currency or points for use in on-line virtual games such as for example and without limitation Second Life or Mafia Wars.

Figure 3:
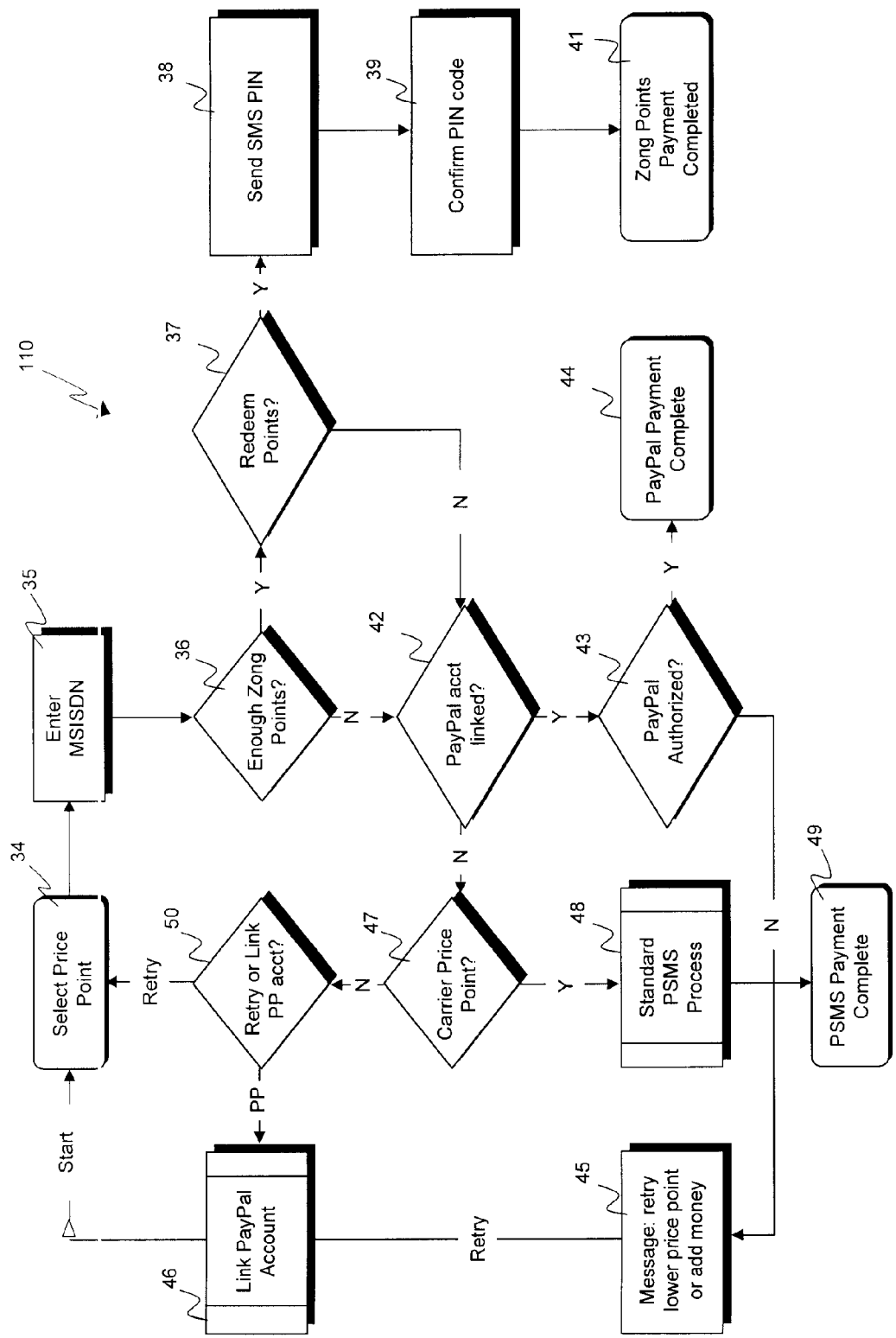
FIG. 3 depicts another illustrative method for authorizing a transaction.

In the illustrative embodiment 110 of FIG. 3, the customer again chooses 34 a price point 21. Illustratively, after a customer enters the identification number, for example a cellular number or MSISDN 35, the system would use the entered number to determine 36 if the user already has any incentive points. If the customer has enough incentive points to cover the selected price point, then the customer will be asked 37 if it would like to redeem the points to purchase the product. If the customer answers yes, then a PIN will be sent 38 illustratively via SMS. The system will confirm 39 the PIN and complete 41 payment by deducting incentive points from the user's account as described with other payment methods above.

In the event the user either does not have sufficient incentive points to cover the selected price point, or does not desire to redeem incentive points to cover the selected price point, the system 10 may ask the user or customer how it would like to pay for the product. If the customer would like to use carrier based billing, then the cellular carrier will be billed. If the customer would like to use another account as described above, then that account will be used. Incentives, for example real or virtual currency or points, may be provided to encourage the user to choose one account over the other as desired. For example, the system may determine whether the customer has a PayPal account 42. If so, then the system will determine if use of PayPal is authorized 43. If so, then the PayPal account will be billed 44. If not, for example if the selected price is too high for the account, then the customer will be prompted to retry 45, by for example and without limitation choosing a different price or adding money to the account 46. If it is determined at step 42 that the customer is not linked to a PayPal account, then the system may determine if the price point can support standard PSMS, or credit card or debit card billing 48 and complete the transaction accordingly 49. If not, then the customer may be prompted 50 to retry for example at a lower price or by linking to a PayPal account or other account with sufficient funds.

The invention illustratively may be carried out by a suitable computer program or programs including a medium readable by a processor as known to those skilled in the art.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A system for authorizing a transaction comprising:
   a memory storing at least an identification number uniquely associated with a customer and an authorization code associated with the transaction; and
   a processor configured to:
   display to a customer on a computer a product offered for sale on a product server, the computer and the server each being in communication with an internet;
   receive a request for purchase via the computer the product at a selected price;
   send the computer a request authorization field inviting the customer to enter an identification number uniquely associated with the customer;
   receive, from the customer, the unique identification number entered into the request authorization field;
   verify the identification number;
   transmit an authorization code to a communication device associated with the customer via the unique identification number;
   receive, from the customer, the authorization code entered into an authorization field displayed on the computer;
   verify the authorization code;
   offer the customer an incentive to charge the purchase to an account other than a customer's cellular phone carrier account;
   select an account associated with the customer to charge the purchase from a plurality of customer accounts; and
   charge the price to the selected account associated with the customer.

2. The system of claim 1 wherein the identification number comprises the customer's cellular phone number.

3. The system of claim 1, wherein the authorization code comprises a personal identification number.

4. The system of claim 1, wherein the communication device comprises a cellular phone.

5. The system of claim 1, wherein the communication device is chosen from the list comprising a cellular phone, a smart phone, and a personal data assistant.

6. The system of claim 1, wherein the processor is further configured to transmit the authorization code over a cellular phone network.

7. The system of claim 1, wherein the account to be charged is the customer's phone carrier bill and wherein the processor is further configured to charge the selected account by adding the price of the product to the customer's cellular phone carrier bill.

8. The system of claim 1, wherein the plurality of customer accounts comprises a cellular phone carrier account, a credit card account, a debit account, a checking account, a savings account, a brokerage account, an insurance account, an e-commerce money transfer account, an incentive points account, a virtual points account, and a virtual currency account.

9. The system of claim 1, wherein the processor is further configured to offer an e-commerce money transfer account.

10. The system of claim 1, wherein the processor is further configured to provide a notice of transaction completion.

11. The system of claim 1, wherein the processor is further configured to perform steps in a secure environment.

12. A non-transitory computer readable storage medium readable by a processor, the medium carrying instructions which, when executed by the processor, cause the processor to:
   display to a customer on a computer a product offered for sale on a product server, the computer and the server each being in communication with an internet;

register a customer's chosen product for purchase via the computer at a selected price;

send the computer a request authorization field inviting the customer to enter an identification number uniquely associated with the customer;

verify the identification number entered by the customer;

transmit an authorization code to a communication device associated with the customer via the unique identification number;

receive the authorization code from the customer;

verify the authorization code received from the customer;

offer the customer an incentive to charge the purchase to an account other than a customer's cellular phone carrier account;

select an account associated with the customer to charge the purchase from a plurality of customer accounts; and charge the price to the selected account associated with the customer.

13. The non-transitory computer readable storage medium of claim 12, wherein the authorization code comprises a personal identification number.

14. The non-transitory computer readable storage medium of claim 12, wherein the communication device is chosen from a list comprising a cellular phone, a smart phone, and a personal data assistant.

15. The non-transitory computer readable storage medium of claim 12 wherein the identification number comprises the customer's cellular phone number.

16. The non-transitory computer readable storage medium of claim 15, wherein the authorization code is transmitted over a cellular phone network.

17. The non-transitory computer readable storage medium of claim 15, wherein the account to be charged is the customer's phone carrier bill and wherein the price of the product is added to the customer's cellular phone carrier bill.

18. The non-transitory computer readable storage medium of claim 15, wherein the plurality of customer accounts comprises a cellular phone carrier account, a credit card account, a debit account, a checking account, a savings account, a brokerage account, an insurance account, an e-commerce money transfer account, an incentive points account, a virtual points account, and a virtual currency account.

19. The non-transitory computer readable storage medium of claim 15, wherein the customer is offered an incentive to charge the purchase to the e-commerce money transfer account.

\* \* \* \* \*